US010884207B2

United States Patent
Nagasaki et al.

(10) Patent No.: US 10,884,207 B2
(45) Date of Patent: *Jan. 5, 2021

(54) OPTICAL CONNECTOR CABLE AND METAL MEMBER

(71) Applicant: SUMITOMO ELECTRIC INDUSTRIES, LTD., Osaka (JP)

(72) Inventors: Taisuke Nagasaki, Osaka (JP); Toshihisa Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,840

(22) Filed: May 7, 2019

(65) Prior Publication Data

US 2019/0353861 A1 Nov. 21, 2019

(30) Foreign Application Priority Data

May 18, 2018 (JP) .................................. 2018-096277

(51) Int. Cl.
*G02B 6/44* (2006.01)

(52) U.S. Cl.
CPC ......... *G02B 6/4429* (2013.01); *G02B 6/4471* (2013.01); *G02B 6/4477* (2013.01)

(58) Field of Classification Search
CPC ... G02B 6/4429; G02B 6/4471; G02B 6/4477
See application file for complete search history.

(56) References Cited

U.S. PATENT DOCUMENTS

| | | | | |
|---|---|---|---|---|
| 4,447,120 A * | 5/1984 | Borsuk | ................. | G02B 6/4471 385/136 |
| 4,948,222 A * | 8/1990 | Corke | ................. | G02B 6/3889 385/100 |
| 5,166,997 A * | 11/1992 | Norland | ................ | G02B 6/3887 385/87 |
| 6,389,214 B1 * | 5/2002 | Smith | .................. | G02B 6/3878 385/136 |

(Continued)

FOREIGN PATENT DOCUMENTS

| | | |
|---|---|---|
| JP | 2013-152420 A | 8/2013 |
| JP | 2014-38272 A | 2/2014 |

OTHER PUBLICATIONS

Office Action dated Mar. 13, 2020 that issued in U.S. Appl. No. 16/404,829.

*Primary Examiner* — Daniel Petkovsek
(74) *Attorney, Agent, or Firm* — Faegre Drinker Biddle & Reath LLP

(57) ABSTRACT

An optical connector cable comprising an optical cable, a metal member, and a resin member is disclosed. The optical cable includes an optical fiber extending in a first direction, a tensile strength body provided along the optical fiber, and a jacket surrounding the optical fiber and tensile strength body. The optical fiber and the tensile strength body extend outside from an end of the jacket. The metal member includes a winding structure around which the tensile strength body extending outside from the end of the jacket is wound. The resin member holds the metal member and an extended portion of the optical fiber extended from the end of the jacket. The winding structure of the metal member is embedded in the resin member.

18 Claims, 10 Drawing Sheets

(56) References Cited

U.S. PATENT DOCUMENTS

| | | | |
|---|---|---|---|
| 7,093,984 B2 * | 8/2006 | Cox | G02B 6/3887 385/86 |
| 8,039,745 B2 * | 10/2011 | Sedor | G02B 6/4477 174/74 R |
| 8,172,465 B2 * | 5/2012 | Kleeberger | G02B 6/4472 385/134 |
| 8,816,222 B2 * | 8/2014 | Pimentel | G02B 6/4477 174/650 |
| 9,116,310 B2 * | 8/2015 | Bran De Leon | G02B 6/3887 |
| 9,383,532 B2 * | 7/2016 | Yokochi | G02B 6/4435 |
| 2010/0158452 A1 * | 6/2010 | Takahashi | G02B 6/2551 385/96 |
| 2014/0241674 A1 * | 8/2014 | Isenhour | G02B 6/4284 385/93 |
| 2015/0010282 A1 | 1/2015 | Yokochi | |
| 2019/0353860 A1 * | 11/2019 | Nagasaki | G02B 6/4429 |
| 2019/0353861 A1 | 11/2019 | Nagasaki et al. | |

* cited by examiner

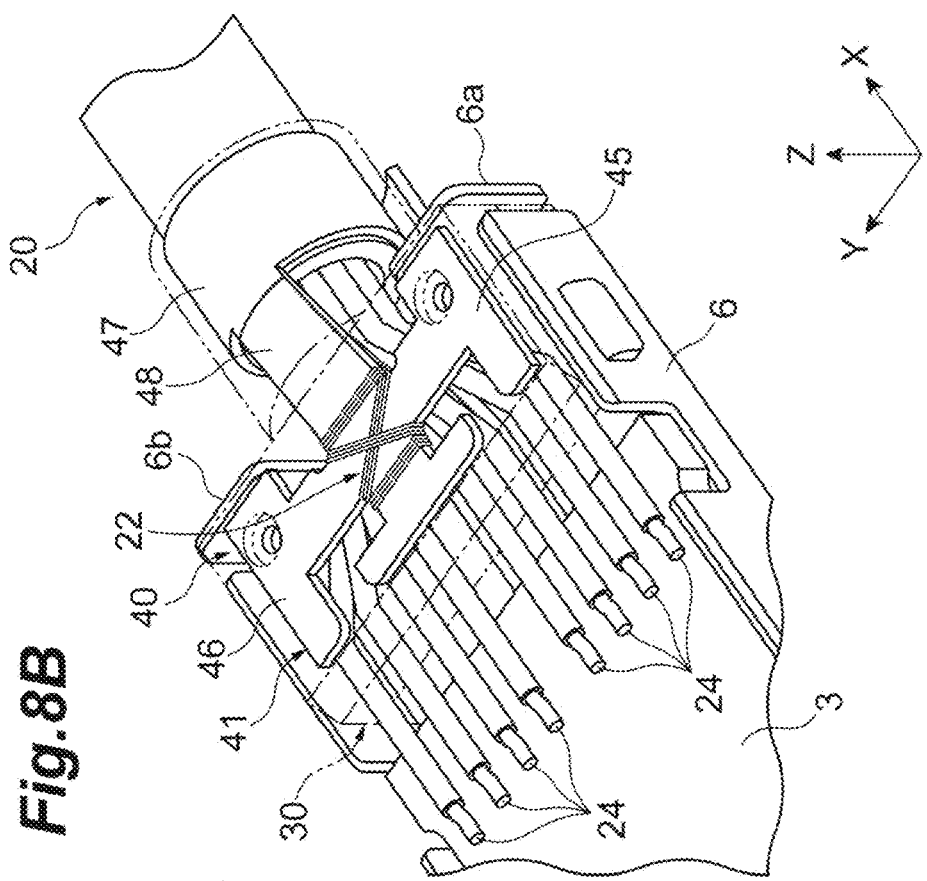
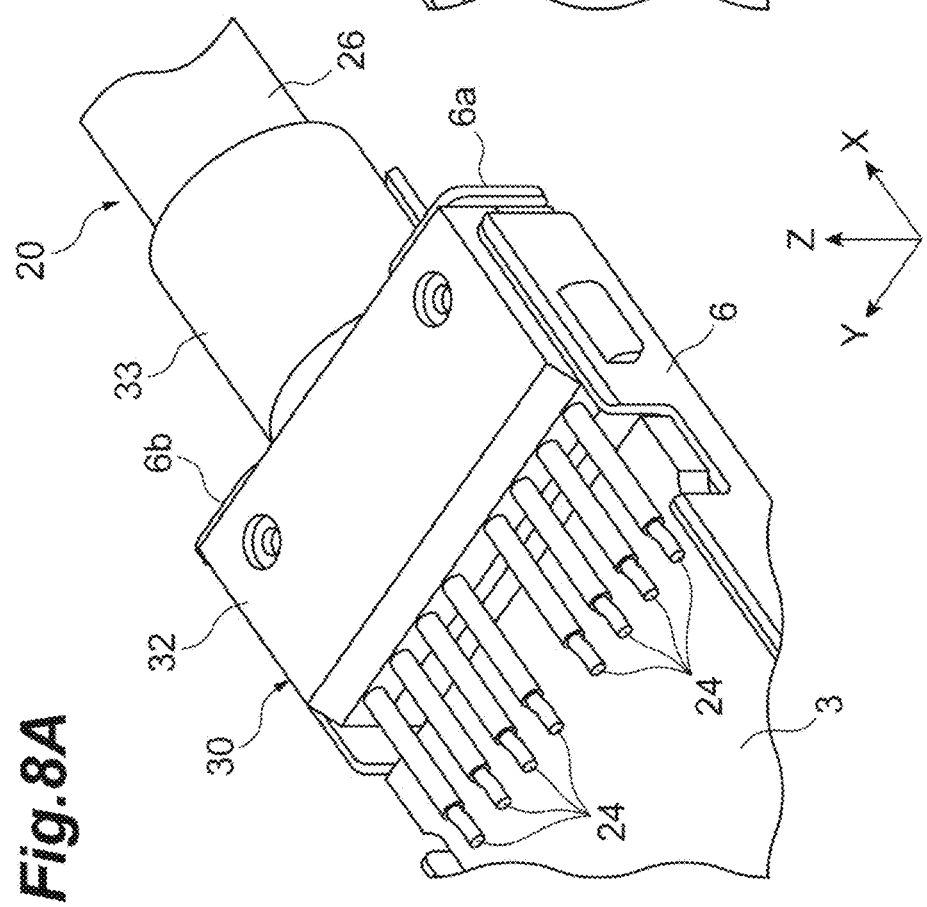

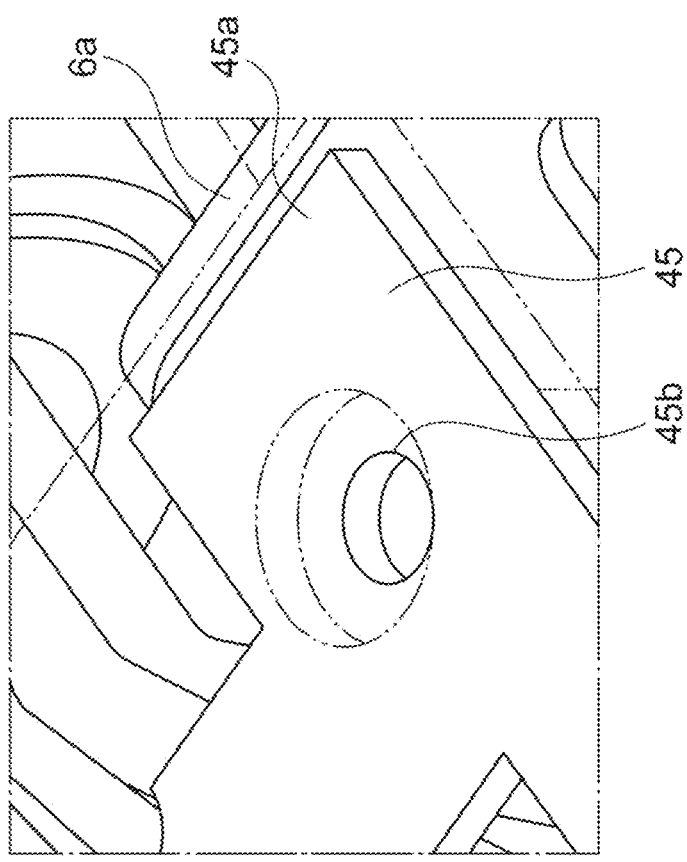
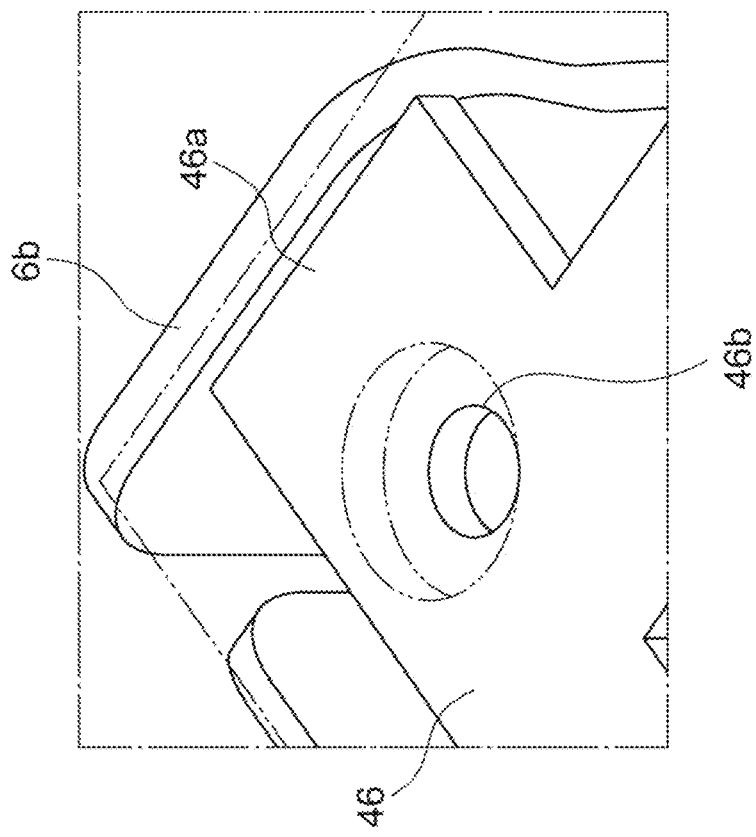

OPTICAL CONNECTOR CABLE AND METAL MEMBER

CROSS REFERENCE TO RELATED APPLICATIONS

The present application is based upon and claims the benefit of the priority from Japanese patent application No. 2018-096277 filed on May 18, 2018, the entire contents of which are incorporated herein by reference.

TECHNICAL FIELD

The present disclosure relates to an optical connector cable and a metal member.

BACKGROUND

JP2013-152420A and JP2014-038272A respectively disclose an optical module in which a tensile strength fiber is provided in an optical cable for distributing tensile forces applied to the optical cable. The respective optical modules are provided with the tensile strength fiber along the optical fibers to apply proper tension to the tensile strength fiber, and therefore, an end of the tensile strength fiber is fixed at an end of the optical cable by a terminal fixture.

SUMMARY

The present disclosure provides an optical connector cable. This optical connector cable includes an optical cable, a metal member, and a resin member. The optical cable includes an optical fiber extending along a first direction, a tensile strength body provided along the optical fiber, and a jacket surrounding the optical fiber and the tensile strength body. The optical fiber and the tensile strength body extend outside from an end of the jacket. The metal member includes a winding structure around which the tensile strength body extending outside from the end of the jacket is wound. The resin member holds the metal member and an extended portion of the optical fiber. The extended portion is extended from the end of jacket. The winding structure of the metal member is embedded in the resin member.

The present disclosure also provides a metal member for fixing an optical cable. The optical cable includes an optical fiber extending in a first direction, a tensile strength body provided along the optical fiber, and a jacket surrounding the optical fiber and the tensile strength body. The optical fiber and the tensile strength body extend outside from an end of the jacket. The metal member comprises a winding structure, a swaging structure and a coupling portion. The winding structure is configured such that the tensile strength body extending outside from the end of the jacket is wound around. The swaging structure is configured to attach the metal member to the jacket. The coupling portion is provided between the winding structure and the swaging structure to connect the winding structure with the swaging structure. The winding structure includes a winding main body, a juncture portion, and a beam portion. The winding main body extends along a second direction intersecting the first direction. The juncture portion extends outside along the first direction from an edge of the winding main body. The edge of the winding main body is positioned opposite to the end of the jacket. The beam portion is connected to an edge of the juncture portion opposite to the winding main body and extends along the second direction.

BRIEF DESCRIPTION OF THE DRAWINGS

The foregoing and other purposes, aspects and advantages will be better understood from the following detailed description of embodiments of the present disclosure with reference to the drawings, in which:

FIG. 8A is a perspective view illustrating a state where the terminal structure of the optical cable illustrated in FIG. 4 is housed in a housing member; FIG. 8B is a perspective view illustrating the resin member by a dotted line in the terminal structure of the optical cable housed in the housing member;

FIG. 9A and FIG. 9B are each an enlarged view in which a projecting portion illustrated in FIG. 8B is partially enlarged.

DETAILED DESCRIPTION

Figure 1:
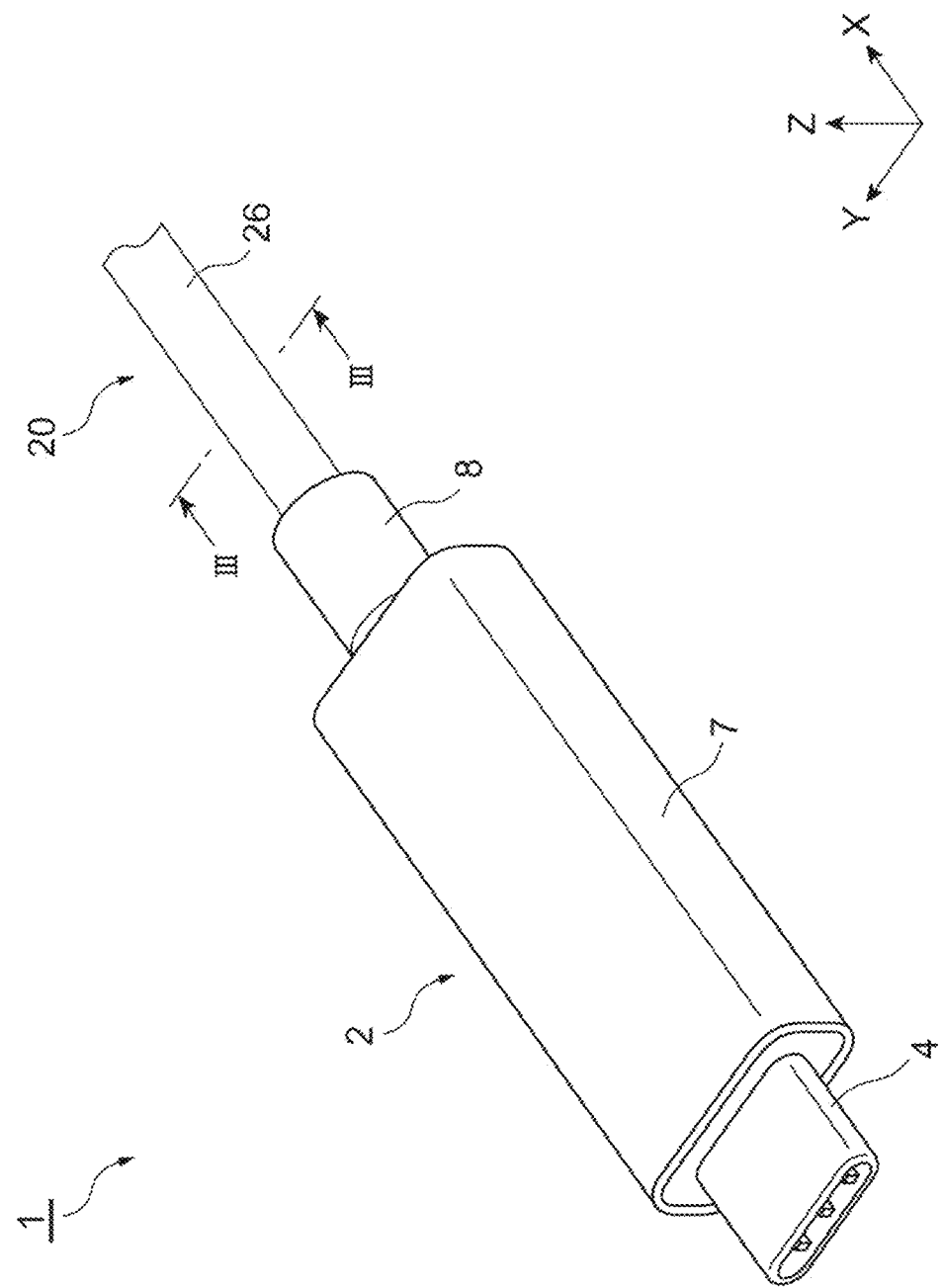
FIG. 1 is a perspective view illustrating an embodiment of an optical connector cable.

Problem to be Solved by the Present Disclosure

The terminal fixture described in JP2013-152420A can reliably fix the tensile strength fiber. However, an assembling process using this terminal fixture, such as winding the tensile strength fiber, is apt to be cumbersome. On the other hand, the assembling process using the terminal fixture described in JP2014-038272A is easy to perform, however, the tensile strength fiber may drop off the terminal fixture when the optical cable is pulled with great force. Thus, a terminal fixture capable of reliably fixing the tensile strength fiber and facilitating the assembling process has been desired to be achieved.

Advantageous Effects of the Present Disclosure

According to the present disclosure, a tensile strength body of an optical cable can be tightly fixed while an assembling process can be facilitated.

DESCRIPTION OF EMBODIMENTS OF THE PRESENT DISCLOSURE

Details of embodiments of the present disclosure are listed and described. The optical connector cable according to one aspect of the present disclosure includes an optical cable, a metal member, and a resin member. The optical cable includes an optical fiber extending in a first direction, a tensile strength body provided along the optical fiber, and a jacket surrounding the optical fiber and tensile strength body. The optical fiber and the tensile strength body extend outside from an end of the jacket. The metal member includes a winding structure around which the tensile strength body extending outside from the end of the jacket is wound. The resin member holds the metal member and an extended portion of the optical fiber extended from the end of the jacket. The winding structure of the metal member is embedded in the resin member.

This optical connector cable includes the metal member having the winding structure that winds the tensile strength body of the optical cable, and the resin member holding the metal member and the optical fiber and embedding the winding structure therein. In this embodiment, the tensile strength body is wound around the winding structure to be fixed to the metal member, and the winding structure of the metal member is further embedded in the resin member. Thus, even if a force in a tensile direction is applied to the tensile strength body, this embodiment can tightly fix the tensile strength body. In addition, since at least the winding structure of the metal member is embedded in the resin member, the metal member or the winding structure thereof can have a simpler configuration as compared to a configuration in which the tensile strength body is tightly fixed by only the metal member. Thus, an assembling process using the optical connector cable of this embodiment, such as winding the tensile strength body can be facilitated.

As one embodiment, the metal member may further include a swaging structure configure to attach the metal member to the jacket, and the swaging structure may be embedded in the resin member. This embodiment can hold the metal member at a desired position with respect to the optical cable by the swaging structure. In addition, since the swaging structure is further embedded in the resin member, this embodiment allows the fixing of the tensile strength body by the metal member to be tighter. Further, since the metal member around which the tensile strength body is wound is attached to the optical cable by the swaging structure, the assembling process such as winding the tensile strength body can be further facilitated.

As one embodiment, the winding structure may include a winding main body, a juncture portion, and a beam portion. The winding main body extends along a second direction intersecting the first direction. The juncture portion extends outside along the first direction from an edge of the winding main body. The edge is positioned opposite to the end of the jacket. The beam portion is connected to the juncture portion opposite to the winding main body. The beam portion extends along the second direction. A width of the juncture portion in the second direction may be smaller than a width of the beam portion in the second direction. Since a part of the resin member enters between the winding main body and the beam portion in this embodiment, this embodiment can prevent the metal member from dropping off the resin member even when a force in the tensile direction is strongly applied to the metal member via the tensile strength body, which allows the tensile strength body to be further tightly and reliably fixed. In addition, since the winding main body, the juncture portion having the narrower width, and the beam portion having a wider width are provided along the first direction in which the optical fiber extends, the juncture portion and beam portion different in the widths can be utilized to temporarily attach the tensile strength body in the work of winding the tensile strength body such that an attaching work can be more easily made.

In the above embodiment, the tensile strength body may be wound across both the edges of the winding main body. The both edges extend along the second direction. Since the tensile strength body can be wound around the metal member along a direction in which the tensile strength body provided along the optical fiber extends in this embodiment, a predetermined tension can be easily applied to the tensile strength body. Further, since the tension application to the tensile strength body can be easily made, tension suitable for the tensile strength body can be applied to allow the optical connector cable to more properly protect the optical fiber.

In the above embodiment, a cutout on which the tensile strength body is wound may be formed on at least one edge of the both edges of the winding main body in the first direction. The both edges extend along the second direction. Since this embodiment can hold the tensile strength body on the cutout of the winding main body in the work of winding the tensile strength body, the winding around the winding main body can be easily achieved, which allows the tensile strength body to be attached to the metal member with the tension applied to the tensile strength body being maintained.

As one embodiment, the above optical connector cable may further comprise a housing member having a lateral wall intersecting the first direction. The housing member houses at least a portion of the resin member therein. The portion of the resin member covers the winding structure. In this optical connector cable, the winding structure may include at least one projecting portion partially exposed from a lateral face of the resin member. The lateral face of the resin member faces the end of the jacket. An exposed edge of the projecting portion may contact the lateral wall of the housing member. Since the optical cable being pulled causes a part of the force in the tensile direction applied to the metal member to be distributed over the housing member via the exposed edge of the projecting portion in this embodiment, this embodiment can prevent deformation of the resin member such that the tensile strength body of the optical cable can be more tightly fixed.

As one embodiment, the optical cable may further include other optical cable, and the resin member may hold the optical fiber and the other optical fiber so as to identify respective locations of the optical fiber and the other optical fiber. Since the resin member identifies the locations of the optical fiber and the other optical fiber in this embodiment, this embodiment can easily achieve positioning of the optical fiber and the other optical fiber with respect to another member.

As one embodiment, the optical cable may further include a plurality of electric wires, and the resin member may hold the plurality of electric wires so as to identify respective locations of the plurality of electric wires. Since the resin member identifies the location of each of the plurality of electric wires in this embodiment, this embodiment can easily achieve positioning of the plurality of electric wires with respect to another member.

As one embodiment, the resin member may include a first portion, a second portion, and a third portion. The first portion embeds the end of the jacket and a swaging structure configured to attach the metal member to the jacket therein. The second portion embeds the winding structure and the wound portion of the tensile strength body therein. The third portion embeds a part of the extended portion of the optical fiber therein. The first portion, the second portion and the third portion are provided from the end of the jacket toward outside in this order. In this embodiment, the first portion may include a cylindrical shape, the second portion may include a substantial rectangular parallelepiped shape, and the third portion may include a plate shape. In this embodiment, a width of the second portion along a second direction intersecting the first direction may be wider than a width of the third portion. A depth of the second portion may be deeper than a depth of the third portion, and may be shorter than a diameter of the first portion. In this embodiment, the third portion may be provided with a recess that is depressed toward the end of the jacket. The resin member may be made of a polyimide resin.

A metal member according to an aspect of the present disclosure is a metal member for fixing an optical cable. The optical cable includes an optical fiber extending in a first direction, a tensile strength body provided along the optical fiber, and a jacket surrounding the optical fiber and the tensile strength body. The optical fiber and the tensile strength body extend outside from an end of the jacket. The metal member comprises a winding structure, a swaging structure and a coupling portion. The winding structure is configured such that the tensile strength body extending outside from the end of the jacket is wound around. The swaging structure is configured to attach the metal member to the jacket. The coupling portion is provided between the winding structure and the swaging structure to connect the winding structure with the swaging structure. The winding structure includes a winding main body, a juncture portion, and a beam portion. The winding main body extends along a second direction intersecting the first direction. The juncture portion extends outside along the first direction from an edge of the winding main body. The edge of the winding main body is positioned opposite to the end of the jacket. The beam portion is connected to an edge of the juncture portion opposite to the wind The winding structure of the metal member includes the winding main body, the juncture portion, and the beam portion. In this embodiment, the tensile strength body can be prevented from coming loose by nipping the tensile strength body between the juncture portion and the beam portion and so on, in winding the tensile strength body across the both ends of the winding main body in the first direction. Thus, the tensile strength body of the optical cable can be more tightly fixed in this embodiment. In addition, since the winding main body, the juncture portion, and the beam portion are provided along a direction in which the tensile strength body provided along the optical fiber extends, the work of winding the tensile strength body around the metal member is likely to be easy to perform.

Detail of Embodiments of the Present Application Invention

Examples of an optical connector cable and a metal member according to an embodiment of the present disclosure will be described with reference to the drawings below. The invention is not limited to the illustrations but is defined by claims, and is intended to include any modification within the meaning and scope equivalent to the claims. In the following description, the same components are designated by the same reference numerals and overlapped description will be omitted.

Figure 2:
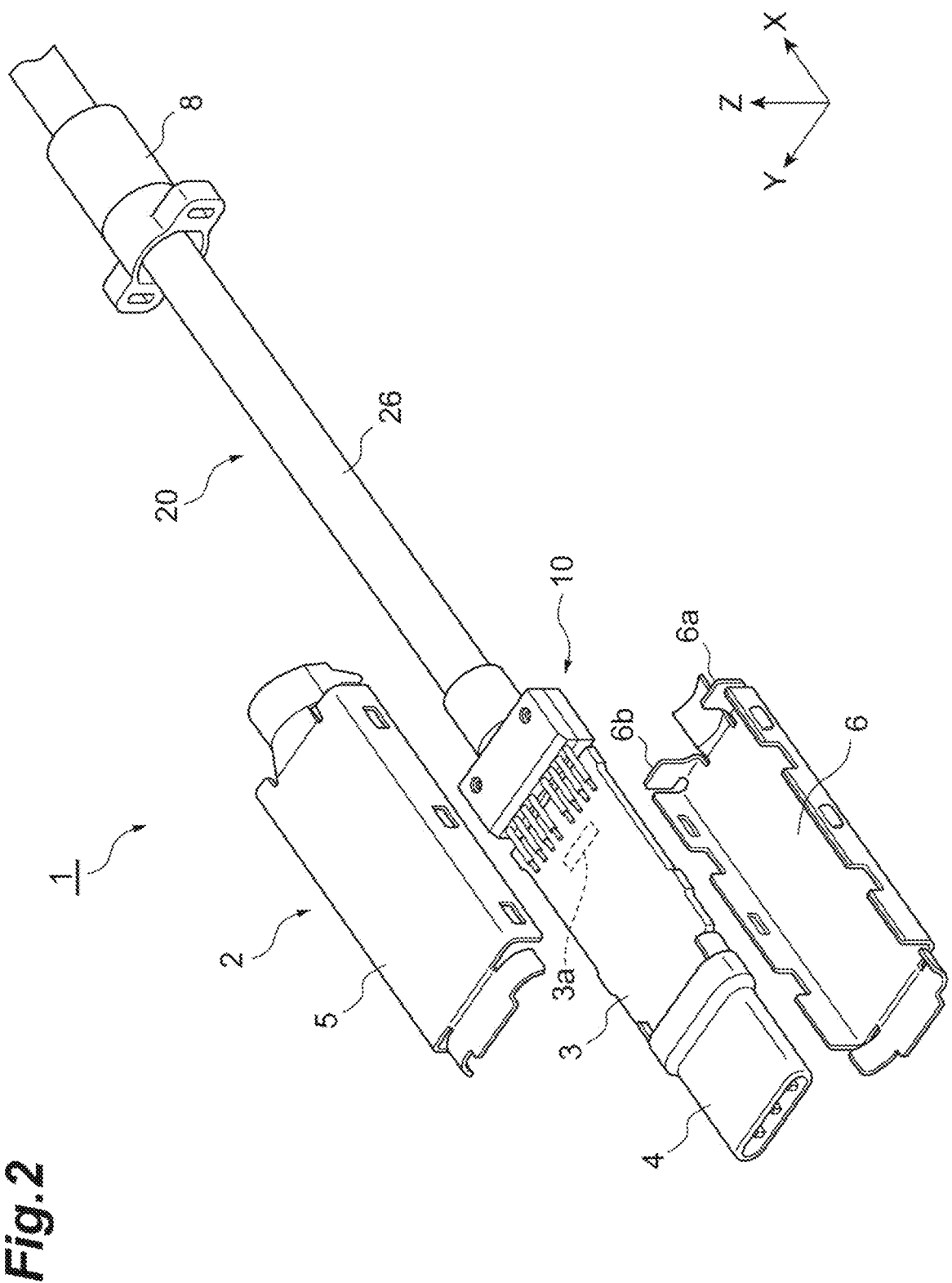
FIG. 2 is an exploded perspective view of the optical connector cable illustrated in FIG. 1.

An optical connector cable 1 according to an embodiment is described referring to FIG. 1 and FIG. 2. FIG. 1 is a perspective view illustrating an embodiment of an optical connector cable. FIG. 2 is an exploded perspective view of the optical connector cable illustrated in FIG. 1. As illustrated in FIG. 1 and FIG. 2, the optical connector cable 1 includes a connector module 2 and an optical cable 20. The connector module 2 is connected to an end of the optical cable 20. The connector has a function to convert respective optical signals from the optical cable 20 into respective electrical signals to output the converted signals to outside, and to convert respective electrical signals from the outside into respective optical signals to output the converted signal to the optical cable 20. The connector module 2 includes a circuit board 3, at least one photoelectric conversion element 3a, a connector 4, housing members 5 and 6, a boot 7, a sealing member 8, and a terminal fixture 10. In FIG. 2, illustration of the boot 7 is omitted. As one example, the connector module 2 may have a plurality of photoelectric conversion elements 3a, such as four photoelectric conversion elements 3a.

The photoelectric conversion element 3a is a light emitting element such as a vertical cavity surface emitting laser (VCSEL) or a light receiving element such as a photodiode (PD). The photoelectric conversion element 5 is mounted on the circuit board 3. The optical cable 20 connects with one end of the circuit board 3 and the connector 4 connects with the other end of the circuit board 3. The photoelectric conversion element 3a converts the optical signal transmitted from the optical cable 20 into the electrical signal, and the connector 4 outputs the electrical signal to the outside. On the other hand, the electrical signal input from the outside is input via the connector 4 and wiring on the circuit board 3 to the photoelectric conversion element 3a. The photoelectric conversion element 3a converts the electrical signal into the optical signal and inputs the optical signal to the optical cable 20.

The housing members 5 and 6 are a member made of a metal (e.g., made of SUS) and housing the circuit board 3, a part of the terminal fixture 10, and an end of the optical cable 20 therein. The housing members 5 and 6 are provided to sandwich the circuit board 3 therebetween in a vertical direction. The housing member 5 has a pair of lateral walls extending along an X-axis direction and a lateral wall perpendicular to the X-axis direction and provided near the end of the optical cable 20. The housing member 6 has a pair of lateral walls extending along an X-axis direction and lateral walls 6a and 6b perpendicular to the X-axis direction and provided near the end of the optical cable 20. That is, the circuit board 3, a part of the terminal fixture 10, and the end of the optical cable 20 are housed in a state of being surrounded by the lateral walls and bottom walls of the housing members 5 and 6. The boot 7 is a member made of a resin, and covering the housing members 5 and 6 and the end of the optical cable 20. The sealing member 8 is a member made of a resin and housed at ends of the housing members 5 and 6 adjacent to the optical cable 20 to seal a partial gap generated in a state that the housing members 5 and 6 mate with each other.

The optical cable 20 is a cable housing most of the optical fibers 21 therein and exposing a leading end of the optical fibers 21 to the outside. The optical cable 20 extends along the X-axis direction. The end of the optical cable 20 is provided with the terminal fixture 10. The terminal fixture 10 is described in detail later. The other end of the optical cable 20 may be provided with a similar terminal fixture 10.

Figure 3:
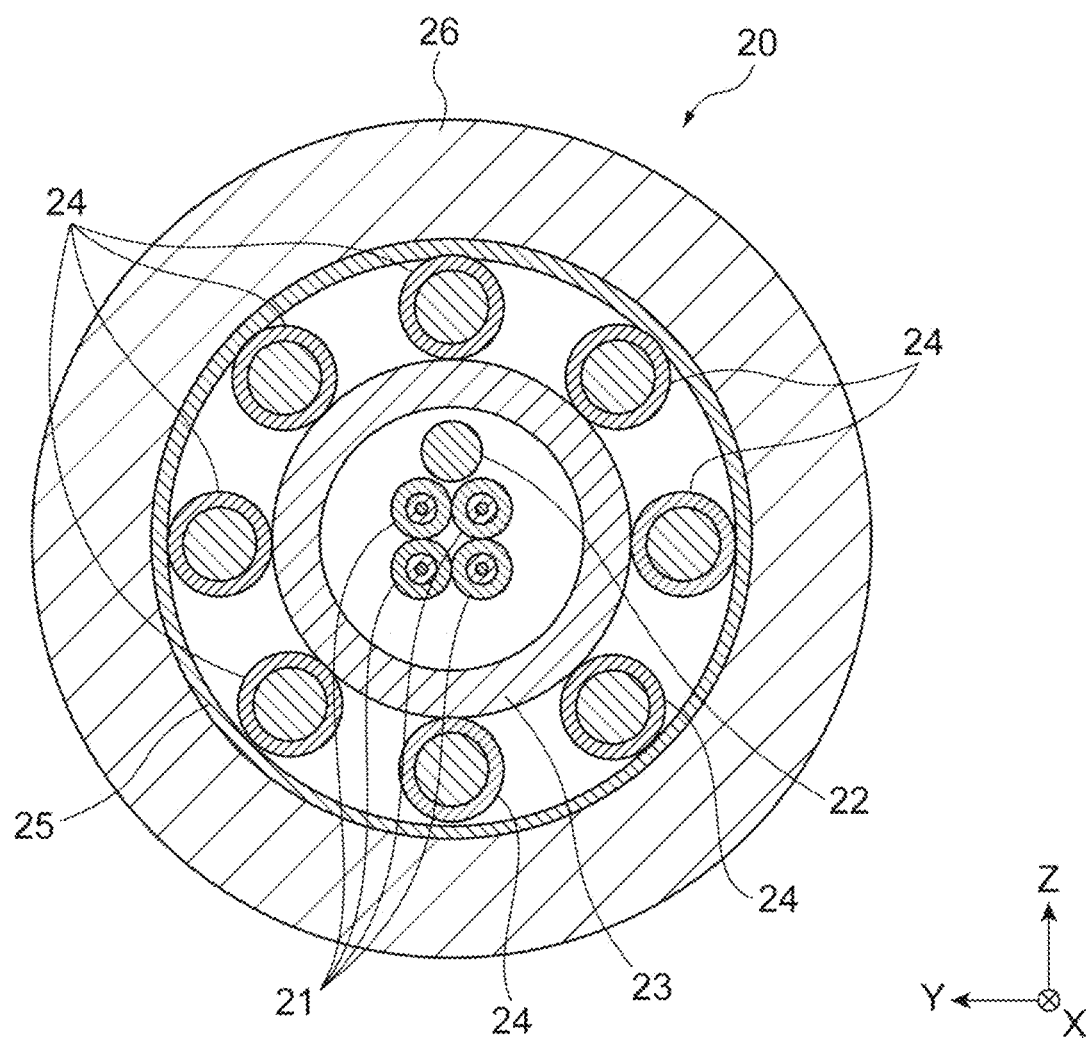
FIG. 3 is a cross-sectional view of an optical cable along a line III-III in the optical connector cable illustrated in FIG. 1.
Figure 4:
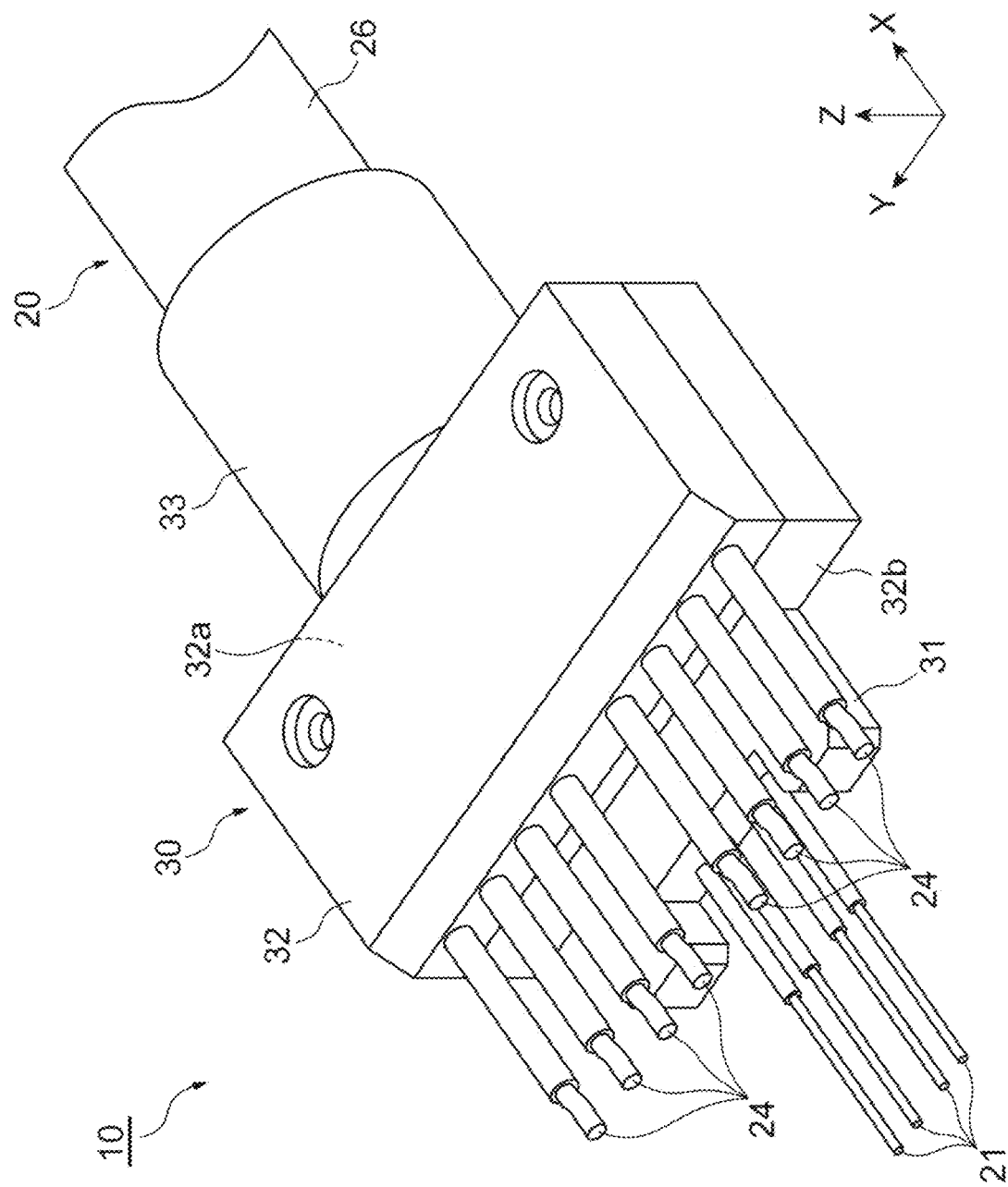
FIG. 4 is a perspective view illustrating a terminal structure of an optical cable provided with a terminal fixture.
Figure 5:
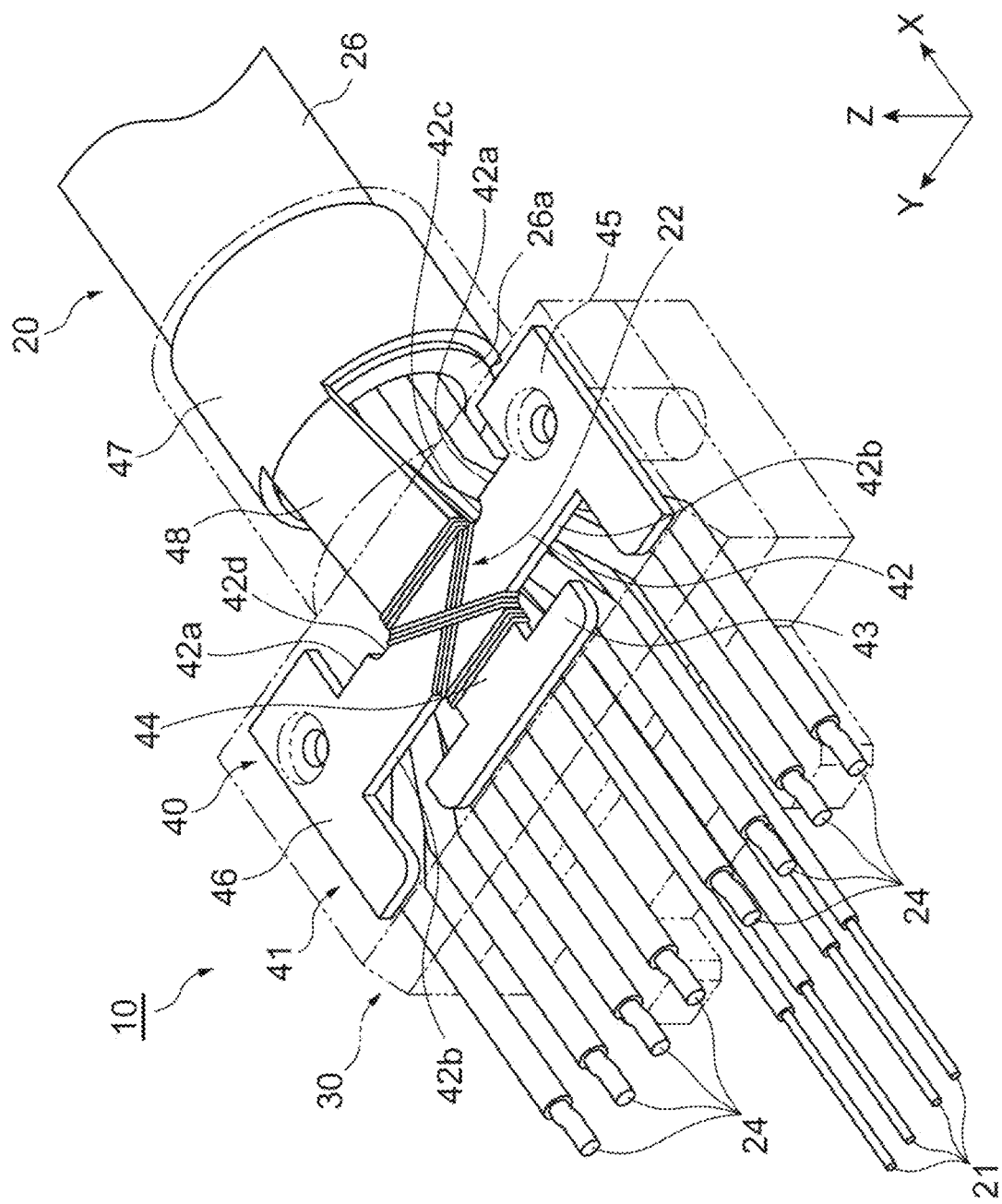
FIG. 5 is a perspective view of the terminal structure of the optical cable illustrated in FIG. 4 with a resin member being depicted by a dotted line.
Figure 6:
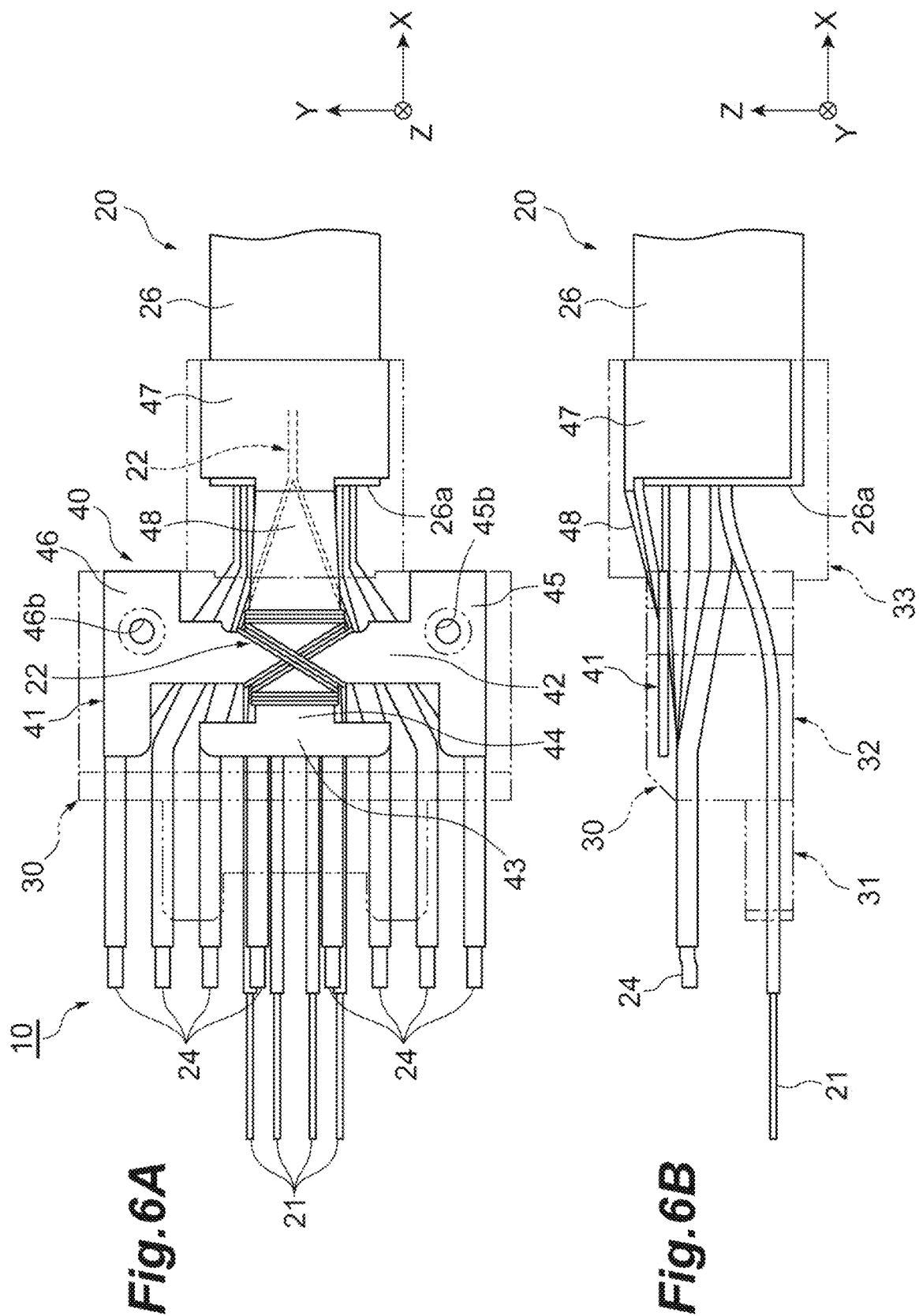
FIG. 6A is a plan view of the terminal structure of the optical cable illustrated in FIG. 5.
FIG. 6B is a lateral view of the terminal structure of the optical cable illustrated in FIG. 5.
Figure 7:
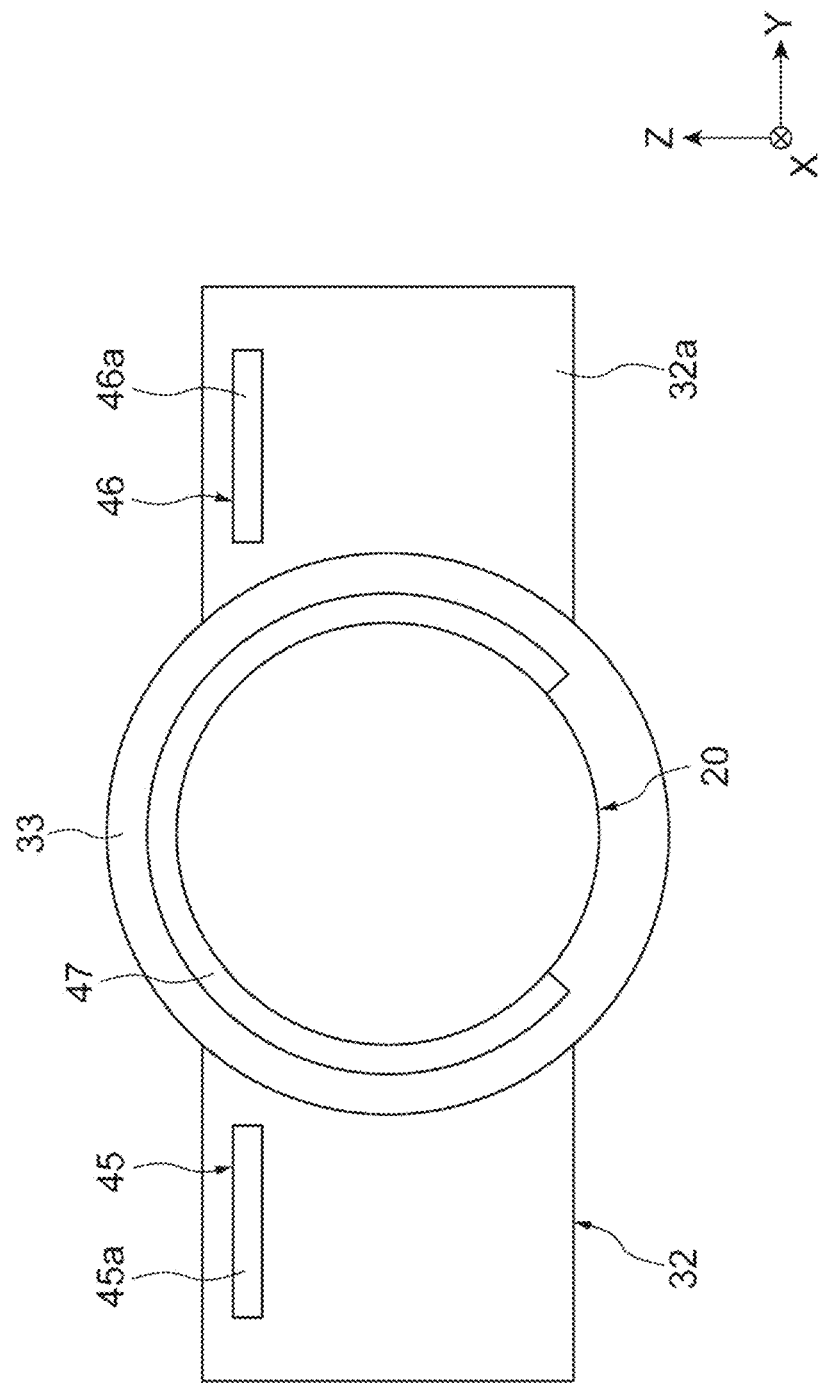
FIG. 7 is a diagram illustrating the terminal structure of the optical cable seen from an opposite to an end of the optical cable.

Next, the optical connector cable 1 is described in further detail referring to FIG. 3 to FIGS. 9A and 9B. FIG. 3 is a cross-sectional view of an optical cable along a line III-III in the optical connector cable illustrated in FIG. 1. FIG. 4 is a perspective view illustrating a terminal structure of an optical cable provided with a terminal fixture. FIG. 5 is a perspective view of the terminal structure of the optical cable illustrated in FIG. 4 with a resin member being depicted by a dotted line. FIG. 6A is a plan view of the terminal structure of the optical cable illustrated in FIG. 5. FIG. 6B is a lateral view of the terminal structure of the optical cable illustrated in FIG. 5. FIG. 7 is a diagram illustrating the terminal structure of the optical cable seen from an opposite to an end of the optical cable. FIG. 8A is a perspective view illustrating a state where the terminal structure of the optical cable illustrated in FIG. 4 is housed in a housing member. FIG. 8B is a perspective view illustrating the resin member by a dotted line in the terminal structure of the optical cable housed in the housing member. FIG. 9A and FIG. 9B are each an enlarged view in which a projecting portion illustrated in FIG. 8B is partially enlarged.

As illustrated in FIG. 3, the optical cable 20 has a plurality of (here, four) optical fibers 21, a tensile strength fiber 22, a tube 23, a plurality of (here, eight) electric wires 24, a tube 25, and a jacket 26. In the embodiment, the optical fibers 21 are two-dimensionally arranged in two rows and two columns, and respectively extend along the X-axis direction. The optical fibers 21 may be two-dimensionally arranged along a circle, or one-dimensionally in one column. The optical cable 20 may include one optical fiber 21 in place of the optical fibers 21.

The tensile strength fiber 22 is a tensile strength body constituted by ultrafine-diameter aramid fibers collected in a bundle form, for example. Examples of the aramid fibers include Kevlar (registered trademark) fibers. The tensile strength fiber 22 is provided along the optical fiber 21. Since the tensile strength fiber 22 is provided in a state of a predetermined tension being applied thereto, even if the optical cable 20 is pulled in the tensile direction opposite to the end thereof, a stress to be applied thereto firstly applies to the tensile strength fiber 22. Thus, the tensile strength fiber 22 prevents the stress from directly applying to the optical fibers 21 and therefore, protects the optical fibers 21. The tube 23 is provided around the optical fibers 21 and the tensile strength fiber 22 to hold the optical fibers 21 and the tensile strength fiber 22 at predetermined positions.

The plurality of electric wires 24 are provided around the tube 23. The electric wires 24 are two-dimensionally arranged along a circle. The tube 25 is provided around the electric wires 24. The tube 25 holds the plurality of electric wires 24 at predetermined positions. The jacket 26 is a protecting member made of a resin and provided around the tube 25. That is, the jacket 26 surrounds the optical fibers 21, the tensile strength fiber 22, and the like. In this way, the optical cable 20 has the optical fibers 21 and the electric wires 24, and is constituted as an opto-electric composite cable. The optical cable 20 may include one electric wire 24. Alternatively, the optical cable 20 may not include the electric wire 24.

In the optical cable 20, as illustrated in FIG. 5 and FIGS. 6A and 6B, the optical fibers 21 and the electric wires 24 are exposed from an end 26a of the jacket 26 and extend outside along the X-axis direction. The tubes 23 and 25 and the jacket 26 surrounding the optical fibers 21 are removed at the extended portion of the optical cable 20 where the optical fibers 21 and the electric wires 24 extend outside from the end 26a. The arrangements of the optical fibers 21 and electric wires 24 change from the two-dimensional arrangements of the optical fibers 21 and electric wires 24 at a portion where the optical fibers 21 and electric wires 24 are surrounded by the jacket 26, to different arrangements at a terminal portion where the optical fibers 21 and the electric wires 24 extend outside. The optical fibers 21 and the electric wires 24 are one-dimensionally arranged, for example, at the terminal portion of the optical fibers 21 and electric wires 24. Such a configuration allows the optical cable 20 to be easily mounted on the circuit board 3.

The optical fibers 21 adjacent to each other are at predetermined distances at the terminal portion of the optical fibers 21, and the optical fibers 21 are aligned along the Y-axis direction. Here, four optical fibers 21 are arranged such that the distances between the optical fibers 21 adjacent to each other are substantially equal to each other. The electric wires 24 adjacent to each other are at predetermined distances at the terminal portion of the electric wires 24, and the electric wires 24 are aligned along the Y-axis direction. Here, eight electric wires 24 are arranged such that the distances between four electric wires 24 from either end in the Y-axis direction adjacent to each other are substantially equal to each other. In the embodiment, the electric wires 24 are located more upward (in a more positive direction in a Z-axis direction) than the optical fibers 21. In order to arrange the optical fibers 21 and the electric wires 24 at predetermined distances, a positioning part (e.g., a part made of a resin) provided in advance with through-holes at predetermined distances may be separately provided to arrange in order the optical fibers 21, the electric wires 24, or the like in the through-holes of the positioning part.

The terminal fixture 10 has a resin member 30 and a metal member 40, as illustrated in FIG. 4 and FIG. 5. The metal member 40 is a member made of a metal (e.g., made of SUS) and attached to the optical cable 20 or the jacket 26. The metal member 40 is formed by die-cutting a metal plate and bending the die-cut metal plate, for example. The metal member 40 has a length of about 7.5 mm to 9.0 mm in the X-axis direction, for example. The metal member 40 is fixed to the end of the optical cable 20 with a part of the metal member 40 being swaged (crimped) to the end of the jacket 26. The tensile strength fiber 22 extending outside from the end 26a of the jacket 26 is wound around the metal member 40. In this way, the metal member 40 is fixed to the optical cable 20 and the tensile strength fiber 22 is wound around the metal member 40, which allows the metal member 40 to hold the tensile strength fiber 22 in state of maintaining the tension to the tensile strength fiber 22. The metal member 40 has a winding structure 41, a swaging structure 47, and a coupling portion 48 connecting the winding structure 41 with the swaging structure 47. The swaging structure 47, the coupling portion 48, and the winding structure 41 are provided in this order from the end of the jacket 26 toward the outside.

The winding structure 41 is a structure around which the tensile strength fiber 22 is wound. The winding structure 41 is arranged more upward than the electric wires 24. The winding structure 41 is provided at a location corresponding to the portion where the two-dimensional arrangement of the optical fibers 21 or the electric wires 24 changes to the one-dimensional arrangement. The winding structure 41 is embedded in the resin member 30. In other words, the winding structure 41 is surrounded and covered by the resin member 30 in a state of being in contact with the resin member 30. The winding structure 41 includes a winding main body 42, a beam portion 43, a juncture portion 44 connecting the beam portion 43 to the winding main body 42, and a pair of projecting portions 45 and 46. The winding main body 42, the beam portion 43, the juncture portion 44, and the projecting portions 45 and 46 are provided to be flush with each other on a plane (X-Y plane) perpendicular to the Z-axis direction, which gives an easy configuration.

The winding main body 42 is a portion around which the tensile strength fiber 22 is mainly wound. The winding main body 42 extends along the Y-axis direction. An end of the coupling portion 48 connects to substantially a center of an edge 42a of the winding main body 42 extending along the Y-axis direction. An end of the juncture portion 44 connects to substantially a center of an edge 42b opposite to the edge 42a of the winding main body 42. A pair of cutout 42c and 42d is formed on the edge 42a. The pair of cutout 42c and 42d is formed near the end of the coupling portion 48. A cutout or a recess may be provided to the edge 42b. In the embodiment, the edges 42a and 42b are longer than a length of the swaging structure 47 in the Y-axis direction in a planar view and the edge 42b is longer than the edge 42a.

The tensile strength fiber 22 is wound across the edges 42a and 42b on the both ends of the winding main body 42 in the X-axis direction. A part of the tensile strength fiber 22 is wound on the winding main body 42 at a predetermined angle to the X-axis direction. The predetermined angle is an angle between a winding direction of a part of the tensile strength fiber 22 and the X-axis direction, and is smaller than 90°. For example, a part of the tensile strength fiber 22 is wound around the winding main body 42 at an angle of 20° to 80° to the X-axis direction. This predetermined angle is different depending on a width of the winding main body 42 in the X-axis direction, a width of the juncture portion 44 in the Y-axis direction, and a width of the coupling portion 48 in the Y-axis direction.

An example of a winding procedure of the tensile strength fiber 22 is described, where firstly the tensile strength fiber 22 extending outside from the end 26a of the jacket 26 is divided into a pair of bundles. Then, one bundle of the tensile strength fiber 22 is wound from the cutout 42c toward the juncture portion for the beam portion 43 on the edge 42b closer to the projecting portion 46. In other words, one bundle of the tensile strength fiber 22 is wound around the winding main body 42 at an angle smaller than 90° to the X-axis direction. The one bundle of the tensile strength fiber 22 is pulled along an upper surface of the winding main body 42, folded back at the juncture portion for the beam portion 43 on the edge 42b, pulled along a lower surface of the winding main body 42, and returns to the cutout 42c to be wound around the winding main body 42 one turn. After wound several turns and a half turn to the juncture portion for the beam portion 43 on the edge 42b, the one bundle of the tensile strength fiber 22 is wound several turns across the both edges of the juncture portion 44 in the Y-axis direction.

The other bundle of the tensile strength fiber 22 is wound from the cutout 42d toward the juncture portion for the beam portion 43 on the edge 42b closer to the projecting portion 45. In other words, the other bundle of the tensile strength fiber 22 is wound around the winding main body 42 at an angle smaller than 90° to the X-axis direction. The other bundle of the tensile strength fiber 22 is pulled along the upper surface of the winding main body 42, folded back at the juncture portion for the beam portion 43 on the edge 42b, pulled along the lower surface of the winding main body 42, and returns to the cutout 42d to be wound around the winding main body 42 one turn. After wound several turns, the other bundle of the tensile strength fiber 22 is wound several turns across the both edges of the coupling portion 48 in the Y-axis direction. The work of winding the tensile strength fiber 22 is performed by a worker, for example. The tensile strength fiber 22 may not be wound across the both edges of the juncture portion 44 in the Y-axis direction, or may not be wound across the both edges of the coupling portion 48 in the Y-axis direction.

The projecting portions 45 and 46 are respectively provided to the both ends of the winding main body 42 in the Y-axis direction. The projecting portions 45 and 46 have configurations the same as each other, and configurations of the projecting portions 45 and 46 are symmetric about a virtual line through substantially a center of the winding main body 42 and extending in the X-axis direction. The projecting portions 45 and 46 extend in the X-axis direction, and are longer than a length of the winding main body 42 in the X-axis direction. A width of an end of each of the projecting portions 45 and 46 closer the end 26a in the Y-axis direction is larger than a width of an end of each of the projecting portions 45 and 46 farther from the end 26a in the Y-axis direction. As illustrated in FIG. 7, leading edges 45a and 46a of the projecting portions 45 and 46 closer to the end 26a are exposed from a lateral face 32a of the resin member 30. In the embodiment, the leading edges 45a and 46a and the lateral face 32a are flush with each other on a plane perpendicular to the X-axis direction. In FIG. 7, illustration of the inner configuration of the optical cable 20 is omitted. Through-holes 45b and 46b penetrating through the projecting portions 45 and 46 are formed on the projecting portions 45 and 46, respectively along the Z-axis direction.

The beam portion 43 is connected to the winding main body 42 via the juncture portion 44 extending along the X-axis direction. The other end opposite to the end of the juncture portion 44 connecting to the winding main body 42 connects to substantially a center of the beam portion 43. The beam portion 43 extends along the Y-axis direction. A width of the beam portion 43 in the Y-axis direction is larger than a width of the juncture portion 44 in the Y-axis direction, and smaller than a width of the winding main body 42 in the Y-axis direction (lengths of the edges 42a and 42b). A width of the beam portion 43 in X-axis direction is smaller than a length of the juncture portion 44 in the X-axis direction. An edge of the beam portion 43 farthest from the end 26a in the X-axis direction is positioned at substantially the same as leading edges of the projecting portions 45 and 46 opposite to the leading edges 45a and 46a. In this way, in the winding structure 41 (metal member 40), spaces defined by the winding main body 42, the beam portion 43, the juncture portion 44, and the projecting portions 45 and 46 are formed.

The swaging structure 47 is a part that swags the metal member 40 to the jacket 26 to be fixed to the optical cable 20. The swaging structure 47 has a predetermined length in the X-axis direction, and has an arc-shaped cross-section seen in the X-axis direction (see FIG. 7). An inner periphery of the swaging structure 47 has a size substantially the same as an outer periphery of the jacket 26. In other words, the centers of the swaging structure 47 and jacket 26 are substantially the same as each other seen in the X-axis direction. The swaging structure 47 is swaged by the worker, for example, in a state that swaging structure 47 is embedded at the end of jacket 26 such that the metal member 40 is attached to the optical cable 20.

The coupling portion 48 connects the winding main body 42 with the swaging structure 47. The coupling portion 48 has a predetermined length longer than the swaging structure 47 in the X-axis direction. The coupling portion 48 has a length of about 2.0 mm to 3.5 mm in the X-axis direction, for example. An end of the coupling portion 48 in the X-axis direction connects to an upper portion of the swaging structure 47 in the Z-axis direction, and the other end of the coupling portion 48 in the X-axis direction connects to the winding structure 41 (the edge 42a of the winding main body 42). As illustrated in FIG. 6B, the coupling portion 48 extends sloping with a height thereof decreasing from the upper portion of the swaging structure 47 toward the edge 42a of the winding main body 42. In other words, a height of the winding structure 41 is lower than the upper portion of the swaging structure 47 connecting to the coupling portion 48. In the embodiment, distances between the plurality of optical fibers 21 and the plurality of electric wires 24 in the Z-axis direction are larger than distances between the plurality of electric wires 24 and the winding main body 42.

The resin member 30 is a member made of a resin and holding the optical fibers 21, the electric wires 24, and the metal member 40. The resin member 30 surrounds a part of each of the optical fibers 21, a part of each of the electric wires 24, and most of the metal member 40. The resin member 30 is formed such that portions of the metal member 40 except for those near the leading edges 45a and 46a and the through-holes 45b and 46b of the projecting portions 45 and 46 are embedded in the resin member 30. The resin member 30 is formed by injection-molding a predetermined resin (e.g., polyamide resin), for example. In forming the resin member 30, first, the tubes 23 and 25 and the jacket 26 on an end of the optical cable 20 are removed by predetermined lengths, the plurality of optical fibers 21, the plurality of electric wires 24, and the tensile strength fiber 22 are made to extend outside from the end 26a of the jacket 26. Then, the tensile strength fiber 22 is wound around the metal member 40 or the winding structure 41. Subsequently, the end of the optical cable 20 is arranged in a mold (not illustrated) having a positioning mechanism holding at desired positions the optical fibers 21 and the electric wires 24 extending outside from the end 26a, and pins engaging with the through-holes 45b and 46b. At this time, the optical fibers 21, the electric wires 24, and the metal member 40 are held at predetermined positions in the mold. Subsequently, a void formed in the mold is filled with a molding resin, and after a predetermined cooling period elapses, the optical cable 20 for which the resin member 30 is formed is taken out. As described above, the resin member 30 is formed on the end of the optical cable 20. In order to arrange the optical fibers 21 and the electric wires 24 at predetermined distances, a positioning portion (e.g., a part made of a resin) provided in advance with through-holes at predetermined distances may be separately prepared to arrange the optical fibers 21, the electric wires 24, or the like in the through-holes of the positioning portion and arrange these in the mold, and thereafter, the injection-molding or the like may be performed.

The resin member 30 includes an optical fiber holding portion 31, main body 32, and a swage covering portion 33. The swage covering portion 33, the main body 32, and the optical fiber holding portion 31 are formed in this order from the end of the jacket 26 toward the outside.

The main body 32 is a portion covering the winding structure 41 and the end of the coupling portion 48 of the metal member 40. That is, the winding structure 41 and the end of the coupling portion 48 are embedded in the main body portion 32. As illustrated in FIG. 4, the main body 32 is formed into substantially a rectangular parallelepiped shape. A length of the main body 32 in the X-axis direction is longer than a length of the winding structure 41 in the X-axis direction (a distance between outer side edges of each of the projecting portions 45 and 46). A length of the main body 32 in the Y-axis direction is longer than a length of the winding structure 41 in the Y-axis direction (a distance between an outer edge of the projecting portion 45 and an outer edge of the projecting portion 46). A height of the main body 32 is larger than a distance between the optical fibers 21 and the winding structure 41 in the Z-axis direction. An end on an upper surface of the main body 32 farther from the end 26a of the jacket 26 is formed into a shape not having a corner. The main body 32 includes the lateral face 32a and a lateral face 32b which are perpendicular to the X-axis direction. As described above, the leading edges 45a and 46a of the projecting portions 45 and 46 are exposed from the lateral face 32a facing the end 26a of the jacket 26. The plurality of electric wires 24 extend from an upper portion of the lateral face 32b toward the outside, and the optical fiber holding portion 31 extends from a lower portion of the lateral face 32b toward the outside. The main body 32 covers each of the electric wires 24, and therefore, holds the electric wires 24 while identifying the location of each of the electric wires 24.

The optical fiber holding portion 31 is a portion holding the plurality of optical fibers 21. The optical fiber holding portion 31 has a predetermined thickness in the Z-axis direction and is formed into a plate shape. For example, the thickness of the optical fiber holding portion 31 in the Z-axis direction is about one-third of the height of the main body 32. A length of the optical fiber holding portion 31 in the X-axis direction is shorter than the length of the main body 32 in the X-axis direction. A length of the optical fiber holding portion 31 in the Y-axis direction is longer than a length of the beam portion 43 in the Y-axis direction and shorter than the length of the winding structure 41 in the Y-axis direction. A leading edge of the optical fiber holding portion 31 is depressed toward the end 26a of the jacket 26, and the optical fibers 21 extend from the depressed portion of the leading edge of the optical fiber holding portion 31 toward the outside. The main body 32 covers each of the optical fibers 21, and therefore, holds the optical fibers 21 while identifying the location of each of the optical fibers 21.

The swage covering portion 33 is a portion covering the swaging structure 47 and most of the coupling portion 48 of the metal member 40. The swage covering portion 33 is formed into a cylindrical shape of which a cross-section perpendicular to the X-axis direction is a circle. The swage covering portion 33 extends from the lateral face 32a of the main body 32 to a direction toward the end 26a of the jacket 26 along the X-axis direction. A length of the swage covering portion 33 in the X-axis direction is equal to a distance between an end of the swaging structure 47 farther from the end 26a and the lateral face 32a of the main body 32. In the swage covering portion 33, a center of the swage covering portion 33 is positioned at a position substantially the same as a center of the jacket 26 and swaging structure 47 seen in the X-axis direction. An outer diameter of the swage covering portion 33 is larger than an outer diameter of the swaging structure 47.

As illustrated in FIG. 8A and FIG. 8B, the optical cable 20 in which the resin member 30 is formed on the end thereof is housed in the housing member 6. Specifically, the circuit board 3, the optical fiber holding portion 31, and the main body 32 are housed in the housing member 6 in a state where the circuit board 3 is inserted between the optical fibers 21 (optical fiber holding portion 31) and the electric wires 24, and the ends of the optical fibers 21 and ends of the electric wires 24 are connected to the circuit board 3. In the state that the end of the optical cable 20 is housed in the housing member 6, the main body 32 is arranged at an end of the housing member 6 in the X-axis direction. In the embodiment, the lateral face 32a of the main body 32 and both lateral faces perpendicular to the lateral face 32a contact with the lateral walls of the housing member 6. As illustrated in FIG. 8B and FIGS. 9A and 9B, the lateral face 32a of the main body 32 contacts with the lateral walls 6a and 6b, and the leading edges 45a and 46a of the projecting portions 45 and 46 of the metal member 40 also contact with the lateral walls 6a and 6b, respectively. After the end of the optical cable 20 is housed in the housing member 6 and the sealing member 8 is brought into contact with the main body 32, the housing member 5 is mated with the housing member 6 (see FIG. 1 and FIG. 2).

Next, a description is given of test results of tension strength of the optical connector cable 1 according to the embodiment. First, as Example 1, the test was performed by pulling the optical cable 20 toward a direction away from the connector module 2 for a predetermined time period (e.g., one minute) in a state where the boot 7 of the optical connector cable 1 is nipped by a jig from both sides thereof in the Y-axis direction to fix the connector module 2. As Example 2, the same test as Example 1 was performed on an optical connector cable having a configuration the same as the configuration of the optical connector cable 1 except that the leading edges 45a and 46a of the projecting portions 45 and 46 of the metal member 40 are not in contact with the lateral walls 6a and 6b of the housing member 6. On the other hand, as Comparison example, the same test as Example 1 was performed on optical connector cable having a configuration of the optical connector cable 1 not including the metal member 40, that is, the configuration in which the tensile strength fiber 22 is directly arranged in the resin member 30. In the test described above, tension strength applied to the optical cable 20 was varied and the tension strength causing breakage such as deformation of the resin member 30 was measured.

In the optical connector cable in Comparison example 1, the tensile strength fiber was fixed by only the resin member and the tensile strength fiber could be held by the resin member against the tension strength of 4 kgf (kilogramforce) to 6 kgf. However, the resin member 30 was broken when the tension strength became over 6 kgf. At that time, the tensile strength fiber broke the resin member by the force in the tensile direction applied to the tensile strength fiber and dropped off the resin member.

In contrast, in the optical connector cable in Example 1, even the tension strength reached 9 kgf to 11 kgf, that is, even the tension strength reached 10 kgf or more that is possibly a target value for a cable for household use, the deformation or breakage of the resin member 30 was not observed and the tensile strength fiber 22 dropping off or the like did not occur. In the optical connector cable in Example 2, even all the force in the tensile direction applied to the tensile strength fiber 22 was applied to the metal member 40, and the tension strength reached 9 kgf to 11 kgf, that is, even the tension strength reached 10 kgf or more that is possibly a target value for a cable for household use, the tensile strength fiber 22 could be held by the resin member 30. However, in the configuration in Example 2, although the tensile strength fiber 22 dropping off the resin member 30 did not occur, a part of the resin member 30 was deformed as the tension strength rose.

As described above, the optical connector cable 1 according to the embodiment includes the metal member 40 having the winding structure 41 winding the tensile strength fiber 22 of the optical cable 20, and the resin member 30 holding the optical fiber 21 and metal member 40 and embedding the winding structure 41 therein. According to this configuration, since the tensile strength fiber 22 is wound around the winding structure 41 to be fixed to the metal member 40, and the winding structure 41 of the metal member 40 is further embedded in the resin member 30, the tensile strength fiber 22 can be tightly fixed, even if the force in the tensile direction is applied to the tensile strength fiber 22. In addition, since the winding structure 41 of the metal member 40 is configured to be embedded in the resin member 30, the metal member 40 or the winding structure 41 can have a simpler configuration, in which one plane is included, as an example, as compared to a configuration of related art in which the tensile strength fiber is tightly fixed by only the metal member, and an assembling process such as winding the tensile strength fiber 22 can be facilitated.

In the optical connector cable 1, the metal member 40 has the swaging structure 47 for attaching the metal member 40 to the jacket 26, and the swaging structure 47 is embedded in the resin member 30. According to this configuration, the swaging structure 47 allows the metal member 40 to be held at a desired position with respect to the optical cable 20, and the swaging structure 47 is further embedded in the resin member 30, which allows the fixing of the tensile strength fiber 22 by the metal member 40 to be tighter. Since the metal member 40 around which the tensile strength fiber 22 is wound is attached to the optical cable 20 by the swaging structure 47, the assembling process such as winding the tensile strength fiber 22 can be further facilitated.

In the optical connector cable 1, the winding structure 41 has the winding main body 42 extending along Y-axis direction, the juncture portion 44 extending outside along the X-axis direction from the edge 42b positioned opposite to the end 26a of the jacket 26 of the winding main body 42, and the beam portion 43 connected to the edge of the juncture portion 44 opposite to the winding main body 42 and extending along Y-axis direction. The width of the juncture portion 44 in Y-axis direction is smaller than the width of the beam portion 43 in Y-axis direction. According to this configuration, since a part of the resin member 30 enters between the winding main body 42 and the beam portion 43, the metal member 40 can be prevented from dropping off the resin member 30 even when the force in the tensile direction is strongly applied to the metal member 40 via the tensile strength fiber 22, which allows the tensile strength fiber 22 to be further tightly and reliably fixed. In addition, since the winding main body 42, the juncture portion 44 having the narrower width, and the beam portion 43 having the wider width are provided along the X-axis direction in which the optical fiber 21 extends, the juncture portion 44 and beam portion 43 different in the widths can be utilized to temporarily attach the tensile strength fiber 22 in the work of winding the tensile strength fiber 22 such that the attaching work can be more easily made.

In the optical connector cable 1, the tensile strength fiber 22 is wound across the both edges 42a and 42b of the winding main body 42 in the X-axis direction. According to this configuration, since the tensile strength fiber 22 can be wound around the metal member 40 along a direction in which the tensile strength fiber 22 provided along the optical fiber extends, that is, the X-axis direction, a predetermined tension can be easily applied to the tensile strength fiber 22. Since the tension application to the tensile strength fiber 22 can be easily made, tension suitable for the tensile strength fiber 22 is applied, which allows the optical connector cable 1 to more properly protect the optical fiber 21.

In the optical connector cable 1, the cutout 42c and 42d on which the tensile strength fiber 22 is wound are formed on the edge 42a of the winding main body 42. According to this configuration, since the tensile strength fiber 22 can be held on the cutout 42c and 42d of the winding main body 42 in the work of winding the tensile strength fiber 22, the winding on the winding main body 42 can be easily achieved, which allows the tensile strength fiber 22 to be attached to the metal member 40 with the tension applied to the tensile strength fiber 22 being maintained.

The optical connector cable 1 includes the housing member 6 having the lateral walls 6a and 6b intersecting the X-axis direction and housing the main body portion 32 of the resin member 30 covering the winding structure 41. In the optical connector cable 1, the winding structure 41 includes the projecting portions 45 and 46 exposed from the lateral face 32a of the resin member 30 facing the end 26a of the jacket 26, and the exposed leading edges 45a and 46a of the projecting portions 45 and 46 are in contact with the lateral walls 6a and 6b of the housing member 6. According to this configuration, since the optical cable 20 being pulled causes a part of the force in the tensile direction applied to the metal member 40 to be distributed over the housing member 6 via the leading edges 45a and 46a of the projecting portions 45 and 46, deformation of the resin member 30 is further prevented such that the tensile strength fiber 22 of the optical cable 20 can be more tightly fixed.

In the optical connector cable 1, the resin member 30 holds the plurality of optical fibers 21 by covering the optical fibers 21 while identifying a location of each of the plurality of optical fibers 21. According to this configuration, since the location of each of the plurality of optical fibers 21 is identified by the resin member 30, positioning of the plurality of optical fibers 21 with respect to the connecting portion of the circuit board 3 can be easily achieved.

In the optical connector cable 1, the resin member 30 holds the plurality of electric wires 24 by covering the electric wires 24 while identifying a location of each of the plurality of electric wires 24. According to this configuration, since the location of each of the plurality of electric wires 24 is identified by the resin member 30, positioning of the plurality of electric wires 24 with respect to the connecting portion of the circuit board 3 can be easily achieved.

The winding structure 41 of the metal member 40 included in the optical connector cable 1 has the winding main body 42 around which the tensile strength fiber 22 is wound, the juncture portion 44 extending outside along the X-axis direction from the edge 42b positioned opposite to the end 26a of the jacket 26 of the winding main body 42, and the beam portion 43 connected to the edge of the juncture portion 44 opposite to the winding main body 42 and extending along Y-axis direction. According to this configuration, in winding the tensile strength fiber 22 across the edges 42a and 42b of the winding main body 42, the tensile strength fiber 22 can be prevented from coming loose by nipping the tensile strength fiber 22 between the juncture portion 44 and the beam portion 43 and so on, the tensile strength fiber 22 of the optical cable 20 can be more tightly fixed. In addition, since the winding main body 42, the juncture portion 44, and the beam portion 43 are provided along a direction in which the tensile strength fiber 22 provided along the optical fiber 21 extends, the work of winding the tensile strength fiber 22 around the metal member 40 or the like is likely to be easy to perform.

Figure 10:
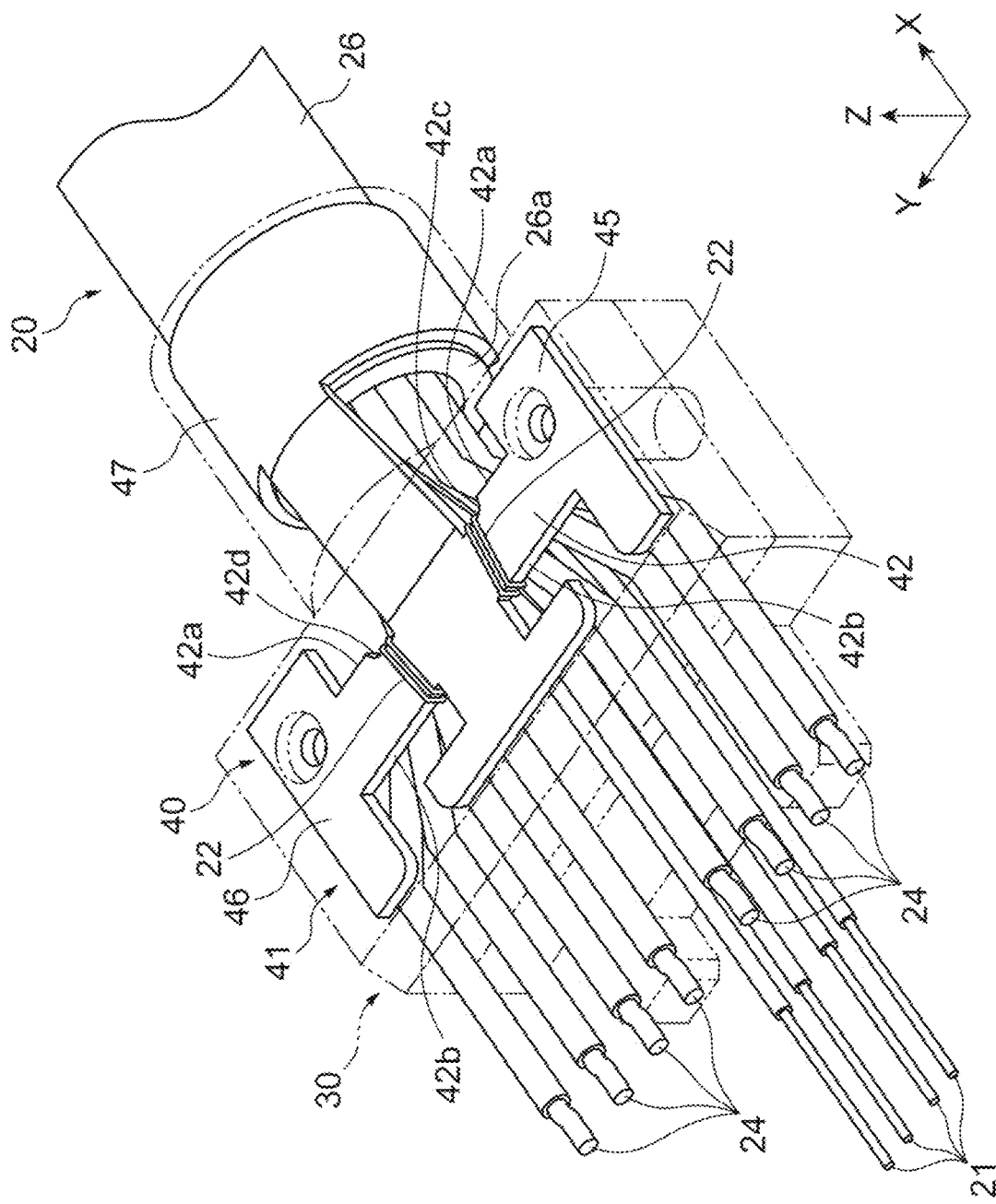
FIG. 10 is a perspective view illustrating a terminal structure of an optical cable in an optical connector cable according to a modification example.

Here, a description is given of an optical connector cable according to a modification example referring to FIG. 10. FIG. 10 is a perspective view illustrating a terminal structure of an optical cable in an optical connector cable according to a modification example. In FIG. 10, the perspective view is illustrated in which the resin member 30 is illustrated by a dotted line in the terminal structure of the optical cable 20 of the optical connector cable according to the modification example. The optical connector cable according to the modification example is different from the optical connector cable 1 mainly in that a winding method of the tensile strength fiber 22 around the winding structure 41. In the following description, points different from the optical connector cable 1 are mainly described and description of common points may be omitted.

As illustrated in FIG. 10, the tensile strength fiber 22 is wound around the winding main body 42 to be substantially parallel to the X-axis direction. In other words, an angle of a direction in which the tensile strength fiber 22 is wound to the X-axis direction is substantially equal to 0. An example of the winding method is described, where firstly, the tensile strength fiber 22 extending outside from the end 26a of the jacket 26 is divided into a pair of bundles. Then, one bundle of the tensile strength fiber 22 is wound from the cutout 42c toward a portion of the edge 42b closer to the projecting portion 45 near the beam portion 43. In other words, the one bundle of the tensile strength fiber 22 is wound around the winding main body 42 at an angle substantially equal to 0° to the X-axis direction.

Specifically, the one bundle of the tensile strength fiber 22 is pulled from cutout 42c along the upper surface of the winding main body 42, folded back at the portion near the beam portion 43 on the edge 42b, pulled along the lower surface of the winding main body 42 toward the end 26a, returns to the cutout 42c to be wound around the winding main body 42 one turn. The one bundle of the tensile strength fiber 22 is wound several turns across the cutout 42c and the portion near the beam portion 43 on the edge 42b. The other bundle of the tensile strength fiber 22 is wound, similar to the one bundle of the tensile strength fiber 22, across the cutout 42d and a portion of the edge 42b closer to the projecting portion 46 near the beam portion 43 at an angle substantially equal to 0° to the X-axis direction.

In the optical connector cable according to the modification example also, the same effect as in the optical connector cable 1 can be obtained. In addition, in the optical connector cable according to the modification example, the winding direction of the tensile strength fiber 22 is closer to a direction of the tension applied to the tensile strength fiber 22 as compared with the optical connector cable 1, and therefore, the tension to the tensile strength fiber 22 is further prevented from changing. The work of winding the tensile strength fiber 22 can be more easily made.

As described above, the optical connector cable and metal member used for the optical connector cable according to the embodiment are described, but the present invention is not limited to those described above, and various modifications can be applied. For example, the metal member 40 may not include the swaging structure 47 or the coupling portion 48. The winding structure 41 of the metal member 40 may not include the beam portion 43. In the winding main body 42, the cutouts may be formed on the edge 42b in place of the edge 42a, and the cutouts may be formed on both the edges 42a and 42b. Alternatively, in the winding main body 42, the cutouts 42c and 42d may not be formed. The swaging structure 47 of the metal member 40 may be formed into a circular shape seen in the X-axis direction. The resin member 30 may not include at least one of the optical fiber holding portion 31 and the swage covering portion 33. The leading edges 45a and 46a of the projecting portions 45 and 46 may project more than the lateral face 32a of the resin member 30. In this case, only the leading edges 45a and 46a may be in contact with the lateral walls 6a and 6b.

What is claimed is:

1. An optical connector cable comprising:
   an optical cable that includes an optical fiber extending along a first direction, a tensile strength body provided along the optical fiber, and a jacket surrounding the optical fiber and the tensile strength body, wherein the optical fiber and the tensile strength body extend outside from an end of the jacket;

a metal member including a winding structure around which the tensile strength body extending outside from the end of the jacket is wound; and a resin member holding the metal member and an extended portion of the optical fiber extended from the end of the jacket, wherein the winding structure of the metal member is embedded in the resin member, wherein a wound portion of the tensile strength body is covered with a resin of the resin member to contact the wound portion with the resin member, and is molded in the resin member, wherein the metal member further includes a swaging structure configured to attach the metal member to the jacket, the swaging structure being embedded in the resin member, wherein the metal member extends between the swaging structure and the winding structure along the first direction and the tensile strength body extends from the end of the jacket along the first direction, and wherein the swaging structure, the winding structure, and an extended portion of the tensile strength body from the end of the jacket which includes the wound portion are embedded in the resin member.

2. The optical connector cable according to claim 1, wherein the winding structure includes a winding main body extending along a second direction intersecting the first direction, a juncture portion extending outside along the first direction from an edge of the winding main body, the edge being positioned opposite to the end of the jacket, and a beam portion connected to the juncture portion opposite to the winding main body, the beam portion extending along the second direction, and wherein a width of the juncture portion in the second direction is smaller than a width of the beam portion in the second direction.

3. The optical connector cable according to claim 2, wherein the tensile strength body is wound across both edges of the winding main body, the both edges extending along the second direction.

4. The optical connector cable according to claim 2, wherein a cutout on which the tensile strength body is wound is formed on at least one edge of both edges of the winding main body, the both edges extending along the second direction.

5. The optical connector cable according to claim 1, further comprising:

a housing member having a lateral wall intersecting the first direction, the housing member housing at least a portion of the resin member therein, the portion covering the winding structure therein, wherein the winding structure includes at least one projecting portion partially exposed from a lateral face of the resin member, the lateral face facing the end of the jacket, and wherein an exposed edge of the projecting portion contacts the lateral wall of the housing member.

6. The optical connector cable according to claim 1, wherein the optical cable further includes another optical fiber, and the resin member holds the optical fiber and the another optical fiber so as to identify respective locations of the optical fiber and the another optical fiber.

7. The optical connector cable according to claim 1, wherein the optical cable further includes a plurality of electric wires, and the resin member holds the plurality of electric wires so as to identify respective locations of the plurality of electric wires.

8. The optical connector cable according to claim 1, wherein the resin member includes a first portion embedding the end of the jacket and the swaging structure, a second portion embedding the winding structure and the wound portion of the tensile strength body therein, and a third portion embedding a part of the extended portion of the optical fiber therein, the first portion, the second portion and the third portion are provided from the end of the jacket toward outside in this order.

9. The optical connector cable according to claim 8, wherein the first portion includes a cylindrical shape, the second portion includes a substantial rectangular parallelepiped shape, and the third portion includes a plate shape.

10. The optical connector cable according claim 8, wherein a width of the second portion along a second direction intersecting the first direction is wider than a width of the third portion.

11. The optical connector cable according to claim 8, wherein a depth of the second portion is deeper than a depth of the third portion, and is shorter than a diameter of the first portion.

12. The optical connector cable according to claim 8, wherein the third portion is provided with a recess that is depressed toward the end of the jacket.

13. The optical connector cable according to claim 1, wherein the resin member is made of a polyamide resin.

14. The optical connector cable according to claim 1, wherein the winding structure has a plate shape extending along the first direction.

15. The optical connector cable according to claim 14, wherein the winding structure includes a front surface and a back surface, and at least one through-hole is formed in the winding structure to extend from the front surface to the back surface.

16. The optical connector cable according to claim 1, wherein the winding structure includes at least one cutout, and the at least one cut out is filled with the resin of the resin member.

17. The optical connector cable according to claim 1, wherein a space between the metal member and a portion of the optical fiber is filled with the resin of the resin member.

18. The optical connector cable according to claim 1, wherein a space between the winding structure and the swaging structure is filled with the resin of the resin member.

* * * * *